TRANSDUCER ASSEMBLY WITH TANDEM BEARING PADS

Filed May 12, 1967

INVENTOR.
CLARENCE R. LINSLEY
HENRY J. PINCZOWER
BY
Joseph R. Dwyer
ATTORNEY

United States Patent Office 3,528,067
Patented Sept. 8, 1970

3,528,067

TRANSDUCER ASSEMBLY WITH TANDEM BEARING PADS

Clarence R. Linsley, La Crescenta, and Henry J. Pinczower, Los Angeles, Calif., assignors to Singer-General Precision, Inc., a corporation of Delaware Filed May 12, 1967, Ser. No. 638,081
Int. Cl. G11b *5/58, 5/60*
U.S. Cl. 340—174.1 3 Claims

ABSTRACT OF THE DISCLOSURE

A flying head construction for magnetic recording. The pitch stability of an elongated shoe or vehicle is improved by dividing the flat working face into tandem bearing pads, with the electromagnetic read/write head disposed between the pads or at the region of the trailing edge of the after pad.

BACKGROUND OF THE INVENTION

This invention relates to magnetic memories. More particularly, it relates to a new and improved construction for the reading and writing head assemblies used in such memories.

In magnetic memories of most types, a recording medium of magnetizable material upon the surface of the disc is passed in close proximity to the working gap of the core of an electromagnetic head. When an electrical signal is applied to the winding of the head for a brief period of time, a magnetic "impression" is made upon the recording surface, creating a very small, magnetized area or "bit" of information. With the aid of appropriate electronic circuitry well known in the art, the presence or absence of this discrete magnetized area can be sensed by the head as being indicative of either of two information quanta, i.e., 1 or 0, black or white, etc.

The read/write head assemblies of magnetic memories, particularly those in which the vehicles, or shoes, carrying the electromagnetic head are of the air-lubricated type, operate in very close proximity to the recording surface, floating upon the thin film of air or other ambient gaseous medium entrained beneath the working face of the stationary head by the rapidly passing magnetic recording surface.

In one type of construction, the head assembly is urged toward the recording surface by spring positioning arms which bear upon a knife-edge fulcrum on the vehicle, permitting freedom of the head assembly to pivot within a small angle in complying with any slight wobble or undulation of the recording surface. In disc type memories in particular, the rotational speed of the discs may be as high as 8,000 or more r.p.m., for small discs of the order of 6 inches in diameter. On one face of such a disc, there may be stored over 1,000 bits of information per circumferential inch of track, and there may be over one hundred concentric tracks.

With the vehicles operating or "flying" upon the entrained thin film of air, the surfaces of their bearing pads and, co-planar with them, the gaps of the read/write heads, are separated from the recording surface by distances of the order of only 50 millionths of an inch. It will be at once apparent that, at such high recording densities and speeds of operation, and such extremely small separation distances, the slightest undulation in the recording surface as it passes beneath the read/write head causes a tendency of the vehicle to dig into the magnetic recording surface at the foot of an approaching rise, and to plunge into the next "valley" and "dig in" after skipping off the peak of the undulation. Such action gives rise to pitch instability in the "flight" of the vehicle, with consequently erratic reading and writing of recorded information by the electromagnetic heads.

SUMMARY

The inventors have discovered that the flight stability of a vehicle or shoe can be greatly increased by arranging the working face of the vehicle so that tandem bearing pads are provided, with a pad at the front and at the rear of the vehicle. The inventors liken this solution of the problem of pitch instability of the vehicle in high-speed disc memories to a long wheelbase automobile, in which a better ride is provided for the passengers because the body of a long vehicle is less subject to the bouncing occasioned by minor variations in the surface of the highway.

It is an object of the invention to provide a construction for a read/write head assembly, offering increased pitch stability and concomittantly improved read/write reliability, over previous constructions.

Other objects of the invention will be apparent from the ensuing description and the accompanying drawing.

DESCRIPTION OF THE PREFERRED EMBODIMENT

Figure 1:
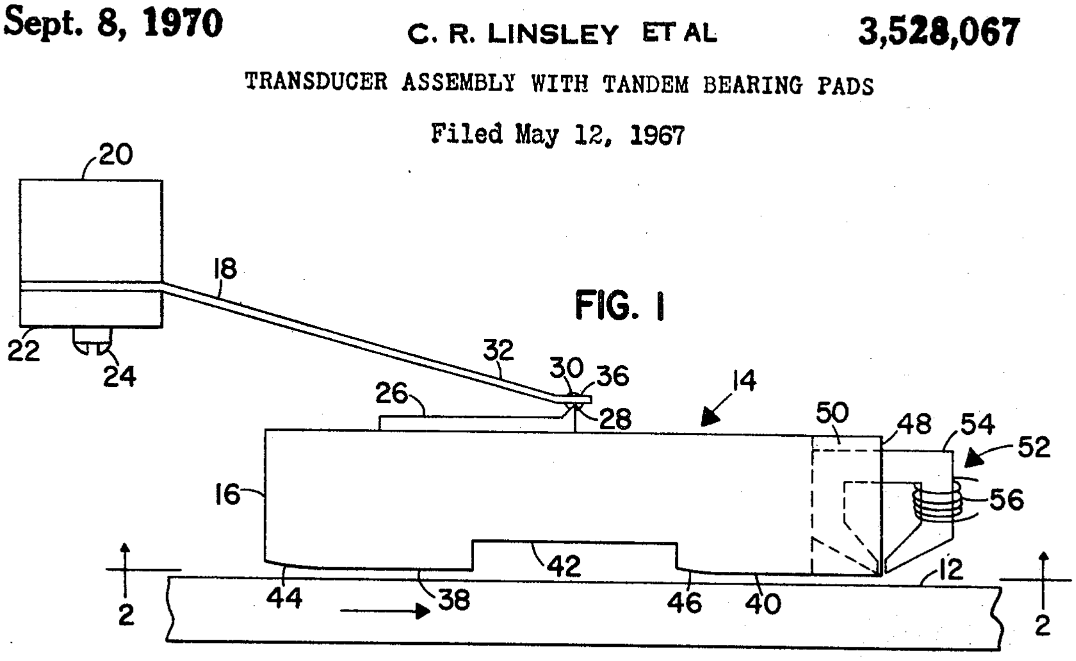
FIG. 1 is a side elevational view of a disc memory embodying the improved read/write head construction according to the invention.

Referring to the drawing, a disc 10, rotating upon a fixed axis and having a magnetic recording surface 12, is provided with a stationary, electromagnetic read/write head assembly 14. The head assembly 14 consists of a shoe or vehicle 16, positioned at the recording surface 12 by means of a bifurcated supporitng spring 18, fastened to a stationary head bar 20 by clamp plate 22 and clamp screw 24.

The shoe or vehicle 16 has a fulcrum plate 26, cemented to its upper surface and bearing at one end a knife-edge 28. The knife-edge 28 is notched to provide recesses in which are seated locating detent balls 30, secured to the knife-edge 28 by welding, cementing or other suitable means.

The bifurcated supporting spring 18 is provided with tines 32 and 34, having at their respective ends locating holes 36 which are slipped over the detent balls 30 in order to position the read/write head assembly 14.

The shoe or vehicle 16 is shown, by way of example, as being of the "flying head" or "air bearing" type, and is provided with a forward bearing pad 38 and an after, or trailing, bearing pad 40, separated by a channel portion 42 extending from side to side of the pads. The bearing pads 38 and 40 constitute the working face of the vehicle and ride upon and are lubricated by the film of air entrained between them and the rotating magnetic recording surface 12. The recording surface 12 is made as smooth and flat as possible, and the disc is journaled and balanced so that it runs with as little wobble and run-out as possible. The bearing pads 38 and 40 are lapped and polished and are flat and co-planar within a few wave-lengths of light. Their leading edges are slightly crowned, as shown at 44 and 46, in order to provide better entry of the entrained film of air. The amount of the crowning in this manner is relatively small, the showing in the drawing being exaggerated for purposes of illustration. When the disc 10 starts to rotate, the shoe or vehicle 16 begins at once to ride upon the thin film of air entrained between it and the disc and, at operating speed, "flies" at an "altitude," or separation distance, of the order of 50 millionths of an inch from the magnetic recording surface 12.

Figure 2:
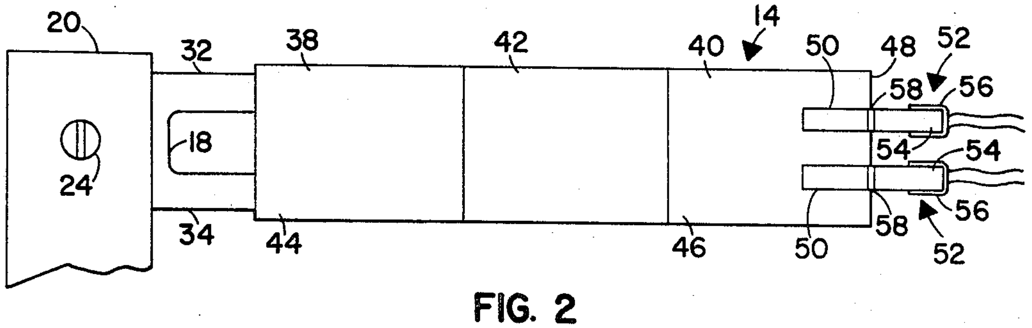
FIG. 2 is a bottom view of the read/write head construction of FIG. 1, taken along the line 2—2 in FIG. 1.

So shown in FIGS. 1 and 2, the vehicle 16 at its after end 48 is provided with one or more slots 50, each having cemented in it an electromagnetic read/write head 52, having a core 54 and winding 56. The core 54 is provided with a working gap 58 disposed so that its bottom edge is precisely co-planar with the bearing pads 38 and 40, the working gap 58 being located at or proximate to the region of the after or trailing end 48 of the vehicle.

Figure 3:
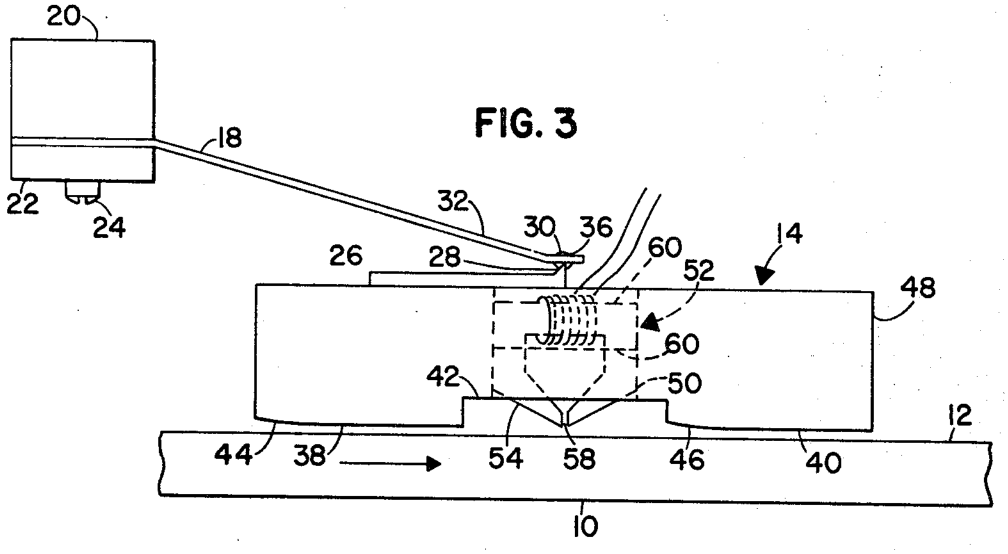
FIG. 3 is a side elevational view of a modified read/write head construction according to the invention.

In FIG. 3, an alternative arrangement is shown in which the electromagnetic read/write heads 52 are located between the pads, preferably at or proximate to the region of the center of the vehicle 16. In this arrangement the cores 54 are cemented within and extend through the slots 50, which, in this instance, extend downwardly from a central recess 60. In this alternative arrangement also, the working gap 58 is precisely co-planar with the bearing pads 38 and 40.

Those skilled in the art will appreciate that modifications may be made in the construction of read/write head assemblies according to the invention, without departing from its spirit and scope.

We claim:

1. A head assembly for recording or sensing information upon a planar magnetic recording surface, there being relative movement between said recording surface and said head assembly, said assembly comprising:

a supporting vehicle having an elongated body;

a working face on said body, adapted to closely overlie said recording surface;

a pair of bearing pads on said working face, said bearing pads being of substantially equal length and having a width corresponding to that of said working face, and said bearing pads being co-planar, spaced apart by a channel extending from side to side of said pads, and disposed in tandem in the direction of relative motion between said vehicle and said magnetic recording surface;

spring means for urging said pair of bearing pads toward the recording surface and upon the thin air film produced by the relative movement between said supporting vehicle and said recording surface; and electromagnetic read/write means having a core supported by said vehicle, said core having a working gap disposed at the working face of said body coplanar with said pads.

2. A head assembly according to claim 1, in which said core is positioned with the working gap disposed at the region of the trailing edge of the after bearing pad, in the direction of relative motion between said head assembly and said recording surface.

3. A head assembly according to claim 1, in which said core is positioned with the working gap disposed between said bearing pads.

References Cited

UNITED STATES PATENTS

| | | | |
|---|---|---|---|
| 3,129,297 | 4/1964 | Schlichting | 340—174.1 |
| 3,197,751 | 7/1965 | Felts | 340—174.1 |

BERNARD KONICK, Primary Examiner

W. F. WHITE, Assistant Examiner

U.S. Cl. X.R.

179—100.2; 340—74